United States Patent
Kanning et al.

(10) Patent No.: US 8,471,908 B2
(45) Date of Patent: Jun. 25, 2013

(54) THREE-DIMENSIONAL MIRROR DISPLAY SYSTEM FOR A VEHICLE AND METHOD

(75) Inventors: Torsten Kanning, Eltville-Erbach (DE); Peter G. Diehl, Pudong (CN); Sam Yang, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 359 days.

(21) Appl. No.: 12/906,387

(22) Filed: Oct. 18, 2010

(65) Prior Publication Data

US 2012/0092498 A1 Apr. 19, 2012

(51) Int. Cl.
*H04N 7/18* (2006.01)

(52) U.S. Cl.
USPC .......... 348/148; 348/51; 348/54; 348/116; 348/118; 349/15; 359/462

(58) Field of Classification Search
None
See application file for complete search history.

(56) References Cited

U.S. PATENT DOCUMENTS

| 5,883,739 A * | 3/1999 | Ashihara et al. ........... 359/462 |
| 2008/0068520 A1* | 3/2008 | Minikey et al. ........... 349/11 |
| 2008/0143895 A1* | 6/2008 | Peterka et al. ........... 349/15 |
| 2008/0197996 A1* | 8/2008 | Kumon ........... 340/461 |

OTHER PUBLICATIONS

Tom Peterka et al., Dynallax: Solid State Dynamic Parallax Barrier Autostereoscopic VR Display; IEEE Virtual Reality Conference, Mar. 10-14, 2007, Charlotte, NC USA.

* cited by examiner

*Primary Examiner* — Sath V Perungavoor
*Assistant Examiner* — Dakshesh Parikh
(74) *Attorney, Agent, or Firm* — Quinn Law Group, PLLC

(57) ABSTRACT

A display system for a vehicle includes a first camera and a second camera adapted to be mounted to the vehicle. A mirror assembly is provided having a display screen and a view divider such as a parallax barrier. A controller is operatively connected to the cameras and to the display screen and is operable to cause the recorded images to appear as a single three-dimensional image when the images are viewed through the view divider. A method of providing an image of an object that is rearward of a vehicle is also provided.

9 Claims, 3 Drawing Sheets

THREE-DIMENSIONAL MIRROR DISPLAY SYSTEM FOR A VEHICLE AND METHOD

TECHNICAL FIELD

The invention relates to a three-dimensional mirror display system for a vehicle and a method for displaying images rearward of a vehicle.

BACKGROUND

Viewing objects rearward of a vehicle is typically done by looking into a rear-view mirror mounted inside the vehicle. The vehicle body and the limited range of the mirror may create blind spots. The driver must consult side view mirrors and physically turn his head to get a more complete view of objects rearward of the vehicle. Moreover, the reflected images are two-dimensional, and appear in reverse (i.e., the left side of an object to the rear of the vehicle appears on the right side of the reflected image of the object, etc.). Some mirror assemblies are configured to decrease the problem of reflected headlights at night, by having a lever that may be used to slightly change the position of the mirror, or are equipped with sensors that automatically dim the mirror when light is detected from the rear, thereby reducing glare.

SUMMARY

A display system for a vehicle includes a first camera and a second camera both adapted to be mounted to the vehicle. A mirror assembly is provided having a display screen and a view divider, such as a parallax barrier. A controller is operatively connected to the cameras and to the display screen and is operable to cause the recorded images to appear as a single, three-dimensional image when the recorded images are viewed through the view divider. The view divider may be a parallax barrier or any other component configured to cause a different image to be seen by the left eye than by the right eye. Specifically, the controller is operable to divide a first image recorded by the first camera into a first plurality of segments, divide a second image recorded by the second camera into a second plurality of segments, and then interleave the first plurality of segments with the second plurality of segments on the display screen. This causes the recorded images to appear as a single, three-dimensional image when the interleaved segments are viewed through the view divider. The display system is also configured to display recorded videos, such as movies, as three-dimensional images.

A method of providing an image of an object that is rearward of a vehicle includes recording a first image of the object from a first vantage point with a first camera mounted to the vehicle, and recording a second image of the object from a second vantage point with a second camera mounted to the vehicle. Next, a controller rectifies the recorded first image and the recorded second image such that both are of a uniform shape and size, and then segments the rectified first image and the rectified second image. The controller then interleaves the segmented first image with the segmented second image, and resizes the interleaved images to be the same size of the rectified images. Finally, the resized, interleaved image is displayed on a display screen spaced from a parallax barrier so that the displayed image appears as a three-dimensional image when viewed through the parallax barrier.

By providing a three-dimensional image, the driver gains better distance perception of objects in the image, such as, for example, rear traffic and other objects rearward of the vehicle. Because no structure interferes with the dual cameras recording the rearward objects, the system provides a panoramic rear view free of blind spots. The driver need not check both the rear view mirror and both side view mirrors in order to achieve the wide-ranging panoramic view. The system is also helpful for parking assistance. Furthermore, viewing the displayed image, rather than relying on a reflective image, avoids the ill effects of headlights reflecting off of the mirror from behind.

The above features and advantages and other features and advantages of the present invention are readily apparent from the following detailed description of the best modes for carrying out the invention when taken in connection with the accompanying drawings.

DETAILED DESCRIPTION

Figure 1:
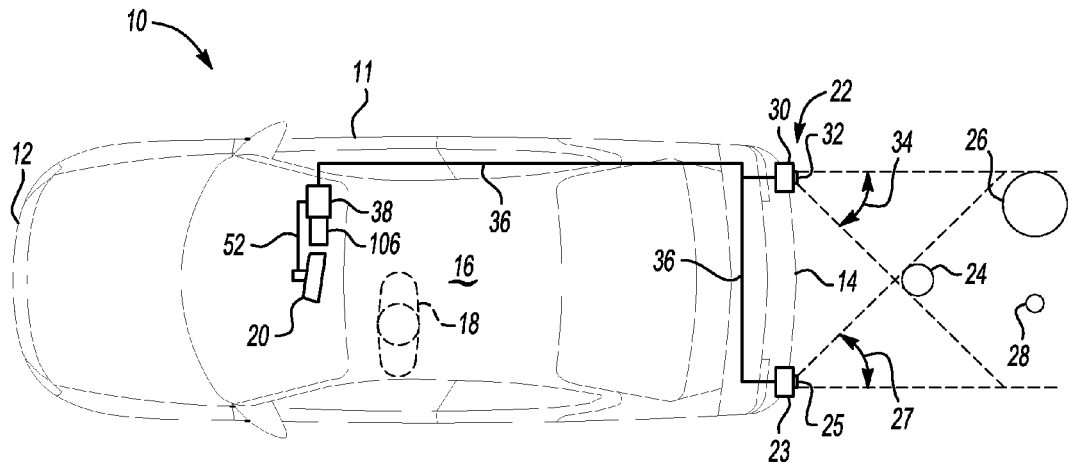
FIG. 1 is a schematic overhead view of a vehicle with a display system that provides a three-dimensional image of objects rearward of the vehicle.

Referring to the drawings, wherein like reference numbers refer to like components throughout the several views, FIG. 1 shows a vehicle 10 having a vehicle body 11 with a front portion 12 and a rear portion 14. The vehicle body 11 defines an interior passenger compartment 16 in which a vehicle occupant 18 is seated facing the front portion 12. An inside rear view mirror assembly 20 is mounted to the vehicle body 11, such as to a front windshield or a front portion of a vehicle headliner. The mirror assembly 20 is part of a display system 22 that enables the occupant 18 to view objects 24, 26, 28 as a three-dimensional image on the mirror assembly 20, as further explained below.

The display system 22 also includes a first camera 23 mounted to the vehicle body 11 at a first vantage point 25 to establish a first field of vision 27. The first camera 23 is operable to record a first image of the objects 24, 26, 28 from the first vantage point 25. The display system 22 further includes a second camera 30 mounted to the vehicle body 11 at a second vantage point 32 to establish a second field of vision 34. The second camera 30 is operable to record a second image of the objects 24, 26, 28 from the second vantage point 32. The first and second cameras 23, 30 may be mounted to the vehicle body 11 in the interior compartment 16 with a view out of the rear window of the vehicle 10, or may be mounted to the vehicle body 11 externally. The first and second cameras 23, 30 are both connected via one or more cables 36 to a controller 38. The controller 38 is operable to provide a display image to the mirror assembly 20 that will appear as a three-dimensional representation of the objects 24, 26, 28 to the occupant 18. Although in the embodiment shown, the cameras 23, 30 are mounted on the vehicle 10 to record images of objects rearward of the vehicle 10, the cameras 23, 30 may alternatively be mounted anywhere on the exterior or interior of the vehicle 10 to record objects in other locations. For example, if mounted inside of the vehicle 10, the cameras 23, 30 could be used to view freight in the trunk of the vehicle. Still further, the cameras 23, 30 could be used to view children in second or third row passenger seats. Cameras could be available for different views, such as rearward of the vehicle, the trunk compartment, or the second or third row seats. A switch could be operated by the driver to switch the view shown on the mirror assembly 20 between the views captured by the different cameras.

Figure 2:
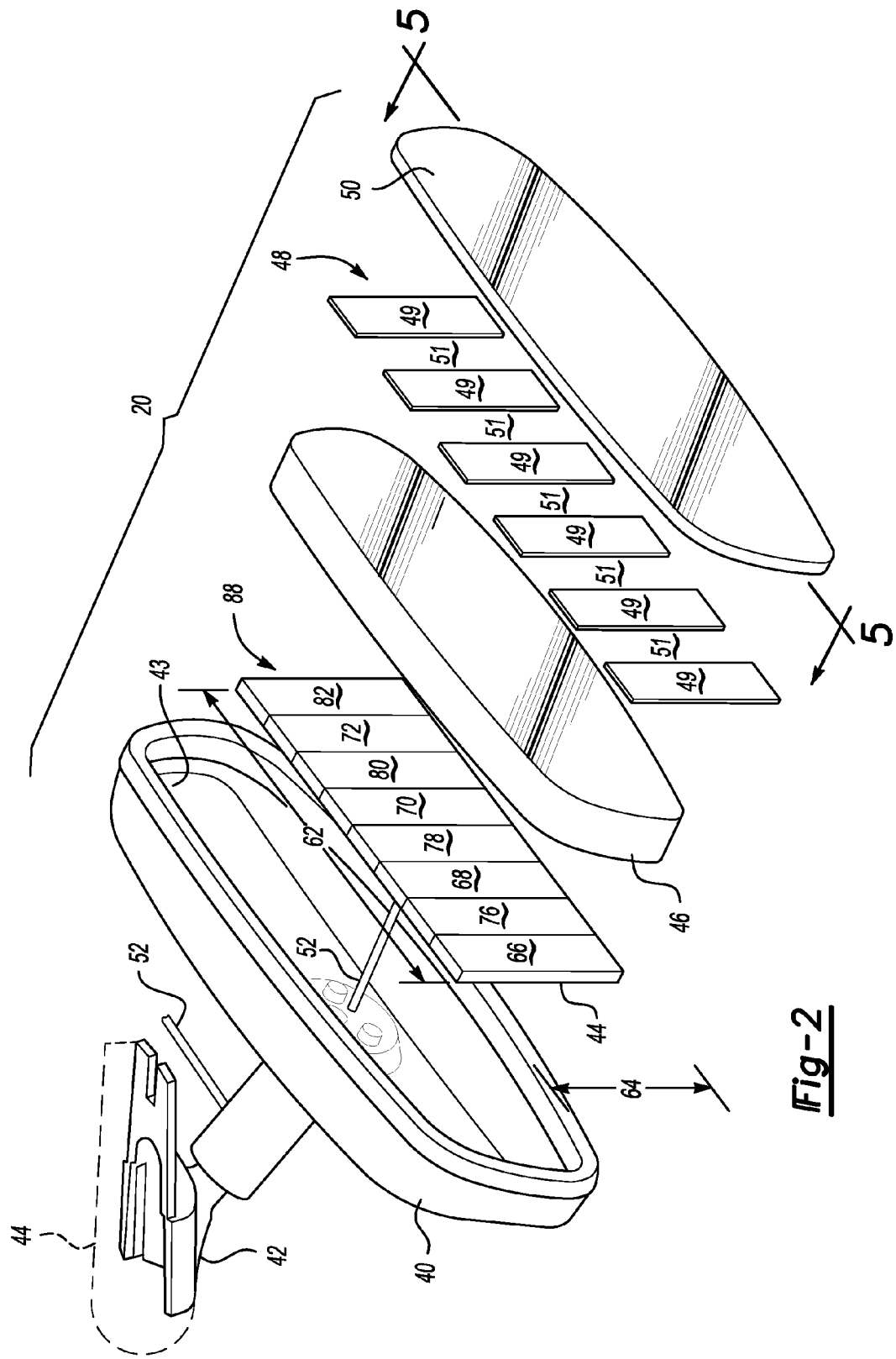
FIG. 2 is a schematic perspective exploded view of a mirror assembly included in the display system of FIG. 1.

Referring to FIG. 2, the mirror assembly 20 is shown in greater detail. The mirror assembly 20 includes a housing 40 with a mounting feature 42 that attaches to a mating mounting feature 44 on the windshield or headliner of the vehicle 11 of FIG. 1. The housing 40 forms a partial cavity 43 in which a display screen 44, a transparent member 46, a view divider, which in this embodiment is a parallax barrier 48 and a mirror 50 are supported. Although a parallax barrier 48 is shown, other types of view-dividing components may be used, such as a series of small prisms that cause the right eye to see one set of sides of the prisms and the left eye to see a second set of sides of the prisms. The parallax barrier 48 is a plurality of equally-spaced light-blocking areas 49 of equal size. Unblocked areas 51 (i.e., gaps) between the light-blocking areas 49 are of equal size and width as the light-blocking areas 49. Two different embodiments of the transparent member 46 and parallax barrier may be used. In a first embodiment, the parallax barrier 48 is plastic strips of material 49 and the transparent member 46 is simply air. In that case, the housing 40 would be configured to ensure that the screen 44 and the parallax barrier are maintained a distance t 92 from one another (discussed below). In another embodiment, the transparent member 46 is a liquid crystal display and the parallax barrier 48 is a polarizing film with electrodes on the liquid crystal display. When the electrodes are activated, they form areas of transparent electrolyte 51 causing the liquid crystal of the transparent member 46 behind the transparent electrolyte 51 to form in one direction and become transparent. Areas of the liquid crystal of the transparent member 46 that are not behind the activated transparent electrolyte will not form in one direction, and thus will not be transparent, creating the light-blocking strips 49.

The images recorded by the cameras 23, 30 are fed as electronic signals to the controller 38, and are then modified by the controller 38 of FIG. 1, as described below, and fed by a control cable 52 from the controller 38 to the display screen 44 to be displayed in an interleaved manner. The mirror 50 is a one-way mirror. When the display screen 44 is on (i.e., when the controller 38 provides an image to the display screen 44), only light from the screen 44 can be viewed by the occupant 18, as light reflected off of the mirror 50 is negligible in comparison to the light of the display screen 44. However, when the display screen 44 is off (i.e., deactivated by the controller 38), the one-way mirror 50 functions like an ordinary mirror with reflected light from the rear visible to the occupant 18 in the mirror 50.

Figure 3:
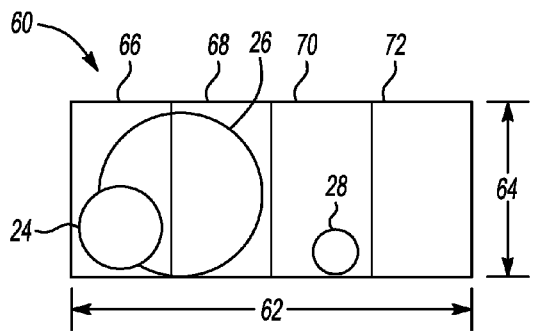
FIG. 3 is a schematic illustration of a segmented first image from a first camera of the display system of FIG. 1.
Figure 4:
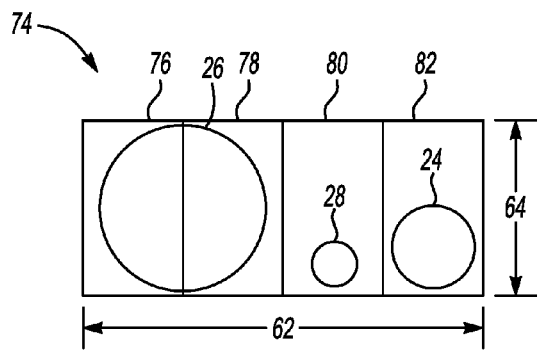
FIG. 4 is a schematic illustration of a segmented second image from a second camera of the display system of FIG. 1.

Referring to FIG. 3, a first image 60 recorded by the first camera 23 of FIG. 1 is rectified by the controller 38 of FIG. 1 to a rectangular shape and size of width 62 and height 64. The first image 60 is divided or segmented into a first group of segments 66, 68, 70 and 72. Each of the segments 66, 68, 70 and 72 represents a portion of the total recorded first image 60. Referring to FIG. 4, a second image 74 recorded by the second camera 30 is rectified by the controller 38 to the same rectangular shape and size of width 62 and height 64 as the first rectified image 60. The second image 74 is divided or segmented into a second group of segments 76, 78, 80 and 82.

Each of the segments 76, 78, 80 and 82 represents a portion of the total recorded second image 74. The first image 60 and the second image 74 show the objects 24, 26, 28 from the different vantage points 25 and 32 of the respective cameras 23, 30.

Referring to FIGS. 1 and 2, after the controller 38 rectifies and segments the first and second images 60, 74 as represented in FIGS. 3 and 4, the rectified and segmented images 60, 74 are then reconstructed by the controller 38 and fed as control signals over control cable 52 to the display screen 44. The signals are configured so that the displayed image 88 on the display screen 44 results from interleaving the segments of the first and second images 60, 74 and resizing the interleaved segments so that display image 88 is also of height 64 and width 62. Therefore, each segment of display image 88 is one-half the width of the same segment in FIGS. 3 and 4. Segments of the first image 60 are alternated with segments of the second image 74, so that they are displayed in the following order from left to right on the display screen 44: segment 66, segment 76, segment 68, segment 78, segment 70, segment 80, segment 72, and segment 82.

The actual number of segments on the display screen 44 and the number of light-blocking areas 49 in the parallax barrier 48 may be greater than shown in the illustration; only a limited number are shown for clarity in the drawings.

Figure 5:
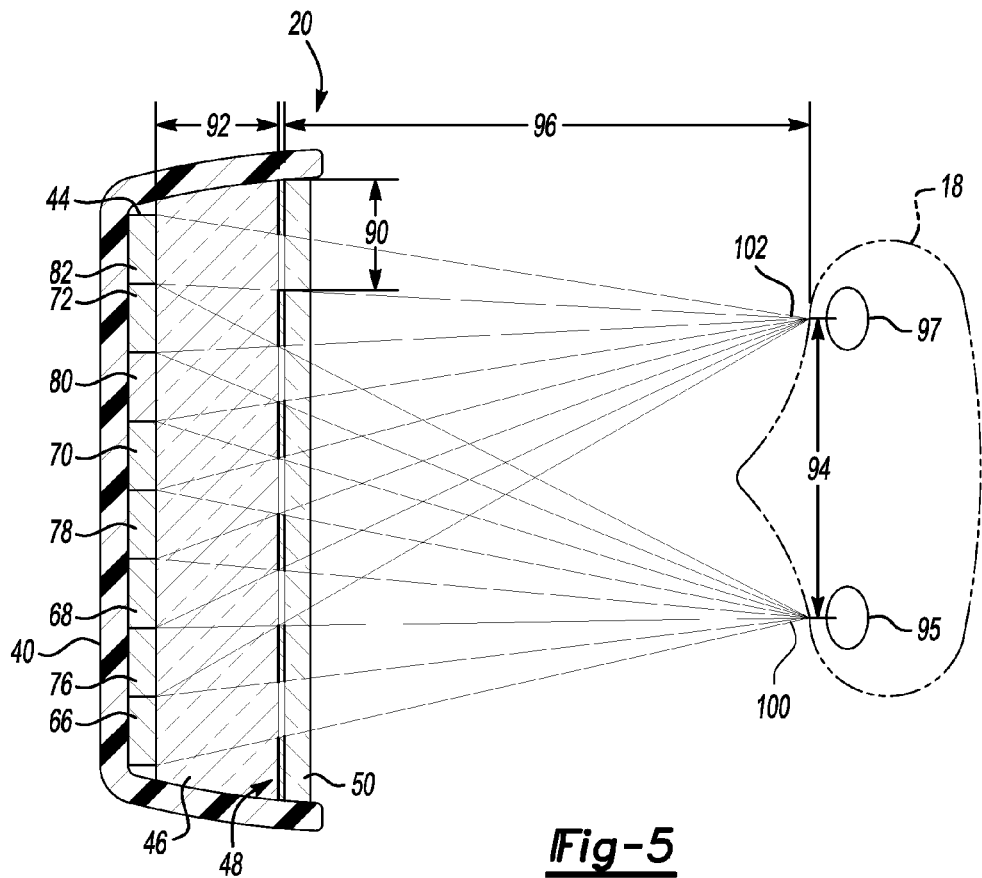
FIG. 5 is a schematic illustration in partial cross-sectional view of the mirror assembly of FIG. 2 taken at arrows 5-5 and shown viewed by a viewer depicted in phantom.

Referring to FIG. 5, the mirror assembly 20 is configured so that the displayed image 88 on the display screen 44 appears as a three-dimensional image of the objects 24, 26, 28 of FIG. 1 to the viewing occupant 18. Specifically, the parallax barrier 48 is configured with a period p of the light-blocking areas 49 (i.e., the distance from the edge of one light-blocking area 49 to the same edge of the next adjacent light-blocking area 49), represented as distance 90 in FIG. 5. Furthermore, the parallax barrier 48 and the display screen 44 are spaced a distance t from one another, represented as distance 92 in FIG. 5. The mirror assembly 20 is configured assuming an occupant 18 has a predetermined intraocular distance e, represented as distance 94 in FIG. 5. Intraocular distance e is the distance between the viewing points of the left eye 95 and the right eye 97. The predetermined intraocular distance e may be an average intraocular distance based on a database of measurements of a representative group of vehicle drivers. The same database may provide a predetermined distance d from the occupant's eyes 95, 97 to the parallax barrier 48, represented as distance 96 in FIG. 5. The mirror assembly 20 is configured so that the ratio of the period p (shown as 90) of the parallax barrier 48 to the distance t (shown as 92) between the display screen 44 and the parallax barrier 48 is related to the predetermined intraocular distance e (shown as 94) and the predetermined distance d (shown as 96) from the eyes 95, 97 to the parallax barrier 48. Specifically, $$p/t = (2e-p)/(d+t).$$

When the mirror assembly 20 is configured as set forth above, optical deflection of the view 100 of the left eye 95 and the view 102 of the right eye 97 will cause the left eye 95 to see the first image 60 of the first camera 23 and the right eye 97 to see the second image 74 of the second camera 30. The parallax barrier 48 prevents the left eye 95 from seeing image 74 and prevents the right eye 97 from seeing image 60. The occupant 18 will process the two different images 60, 74 such that they appear as a single three-dimensional image, as is understood by those skilled in the art with respect to visual perception.

Referring again to FIG. 1, the mirror assembly 20 may also be used to display three-dimensional, prerecorded video, such as movies, in a video-playing mode. In FIG. 1, a video player 106 is connected to the controller 38. The controller 38 is operable to decode the recorded video, and rectify the images in the video. For example, for purposes of illustration, assuming the video images are of the objects 24, 26, 28, the rectified images 60, 74 would be provided by the controller 38 to the display screen 44 in interleaved form as in FIG. 5. As with the recorded images of the cameras 23, 30, the interleaved images from the video player 106 displayed on the display screen 44 will appear as a three-dimensional image to viewer 18.

Figure 6:
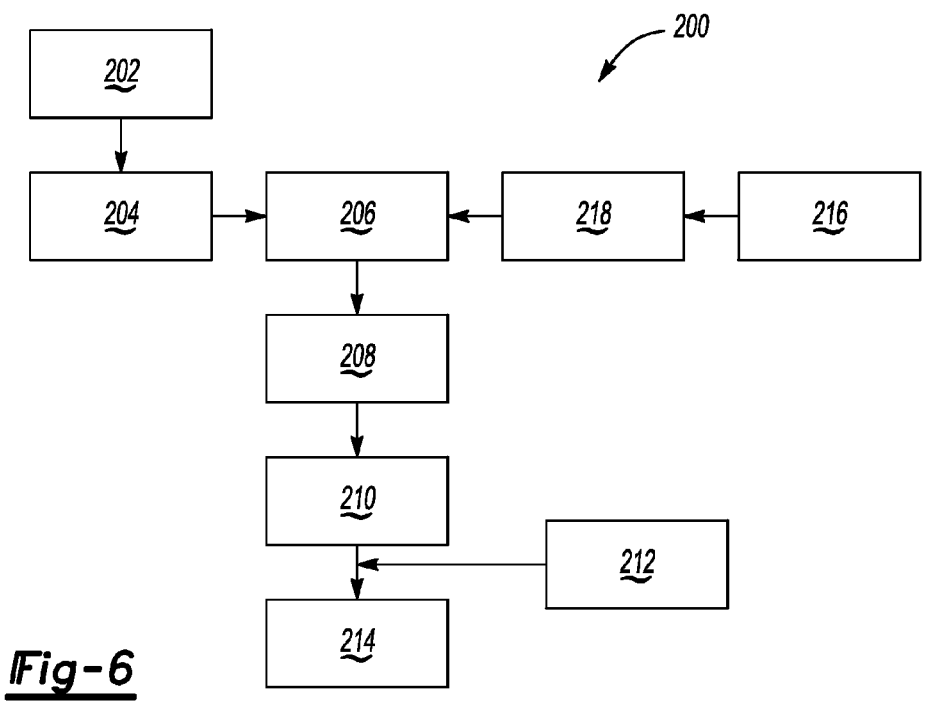
FIG. 6 is a schematic flow diagram of a method of providing a three-dimensional image of an object rearward of a vehicle.

Referring to FIG. 6, a method 200 of providing an image of an object, such as objects 24, 26, 28, is shown as a flow diagram and is described as follows with respect to FIGS. 1-5. First, referring to FIG. 1, the first camera 23 records a first image in step 202, and the second camera 30 records a second image in step 204. The controller 38 then rectifies the recorded images in step 206 so that they appear in the same shape and size, as shown in FIGS. 3 and 4 where both images 60, 74 have height 64 and width 62. Once the recorded images are rectified, they are also segmented in step 208, as also shown in FIGS. 3 and 4 by the first set of segments 66, 68, 70, 72 and the second set of segments 76, 78, 80 and 82. Next, in step 208, the controller 38 reconstructs the images 60, 74 by interleaving the segmented images and then resizing the combined interleaved images in step 210 so that display image 88 is also of the same height 64 and width 62.

The display image 88 is now ready to be viewed so that it will appear as a three-dimensional image. If the parallax barrier 48 is formed by electrodes on the transparent member 46 which is a liquid crystal display, then in step 212, the electrodes are activated to create the light-blocking areas 49. If the parallax barrier 48 is formed from strips of plastic or other light-blocking material, then step 212 is not required. Finally, the image 88 is ready to be displayed on the screen 44 in step 214, and, due to the interleaved segments and the parallax barrier 44, the viewer perceives the display image 88 as a three-dimensional image.

If the mirror assembly 20 is used in video playing mode, then the method 200 begins with step 216, inserting a video in the video player 106 of FIG. 1. Then, in step 218, the controller 38 decodes the recorded video so that it may be rectified into multiple images, like multiple images 60 and 74 of FIGS. 3 and 4. The remainder of the method 200 is the same as that described above for displaying recorded images from the cameras 23, 30.

While the best modes for carrying out the invention have been described in detail, those familiar with the art to which this invention relates will recognize various alternative designs and embodiments for practicing the invention within the scope of the appended claims.

The invention claimed is:

1. A display system for a vehicle comprising:
 a first camera and a second camera each adapted to be mounted to the vehicle;
 a mirror assembly having
  a display screen; and
  a view divider;
 a controller operatively connecting the cameras to the display screen and operable to cause the recorded images to appear as a single, three-dimensional image when the images are viewed through the parallax barrier;
 wherein the view divider is a parallax barrier; wherein the display screen and the parallax barrier are a first predetermined distance t from one another; wherein one of air and a transparent material occupies the first predetermined distance t;
 wherein the parallax barrier has a barrier period p; and wherein a ratio of the barrier period p to the first predetermined distance t is:
 (2e−p)/(d+t), wherein e is a predetermined intraocular distance of a viewer positioned to view the display screen through the parallax barrier, and d is a predetermined distance from the viewer to the parallax barrier.

2. The display system of claim 1, wherein the view divider is a parallax barrier; and wherein the parallax barrier is one of electrodes on a liquid crystal panel and strips of material.

3. The display system of claim 1, in combination with the vehicle, wherein the first camera and the second camera are mounted to the vehicle to record images generally rearward of the vehicle; and wherein the mirror assembly is a rear view mirror mounted inside of the vehicle.

4. A vehicle comprising:
 a vehicle body defining an interior passenger compartment;
 a first camera and a second camera each adapted to be mounted to the vehicle to record images of objects rearward of the vehicle;
 a mirror assembly positioned inside of the passenger compartment and having:
  a mirror positioned to provide a view of objects rearward of the vehicle;
  a housing supporting the mirror;
  a display screen supported by the housing forward of the mirror;
  a parallax barrier positioned in the housing between the display screen and the mirror; and
  transparent material positioned between the display screen and the parallax barrier;
 a controller operatively connecting the cameras to the display screen and operable to divide a first image recorded by the first camera into a first plurality of segments, to divide a second image recorded by the second camera into a second plurality of segments, and to interleave the first plurality of segments with the second plurality of segments and display the interleaved segments on the display screen, thereby causing the recorded images to appear as a single, three-dimensional image when the interleaved segments are viewed through the parallax barrier;
 wherein the mirror is a one-way mirror that provides the view of objects rearward of the vehicle via reflected light when the display screen does not display the interleaved segments;
 wherein the display screen and the parallax barrier are a first predetermined distance t from one another; wherein the parallax barrier has a barrier period p; and wherein a ratio of the barrier period p to the first predetermined distance t is:
 (2e−p)/(d+t), wherein e is a predetermined intraocular distance of a viewer positioned to view the display screen through the parallax barrier, and d is a predetermined distance from the viewer to the parallax barrier.

5. The display system of claim 4, wherein the transparent material is one of air and glass.

6. The display system of claim 4, wherein the parallax barrier is one of electrodes on a liquid crystal panel and strips of material.

7. A method of providing an image of an object that is rearward of a vehicle comprising:
 recording a first image of the object from a first vantage point with a first camera mounted to the vehicle;

recording a second image of the object from a second vantage point with a second camera mounted to the vehicle;

rectifying the recorded first image and the recorded second image such that both are of a uniform size;

segmenting the rectified first image and the rectified second image;

interleaving the segmented first image with the segmented second image;

resizing the interleaved images to the same size as the rectified images;

displaying the resized, interleaved images on a display screen spaced from a parallax barrier so that the displayed images appear as a three-dimensional image when viewed through the parallax barrier;

wherein the parallax barrier has a barrier period p; and wherein a ratio of the barrier period p to the first predetermined distance t is:

$(2e-p)/(d+t)$, wherein e is a predetermined intraocular distance of a viewer positioned to view the display screen through the parallax barrier, and d is a predetermined distance from the viewer to the parallax barrier.

8. The method of claim 7, further comprising:

activating electrodes on a liquid crystal panel to establish the parallax barrier.

9. The method of claim 7, further comprising:

decoding a three-dimensional movie into multiple movie images;

rectifying the movie images such that all of the movie images are of a uniform size;

segmenting the rectified movie images;

interleaving the segmented movie images;

resizing the interleaved movie images to the same size as the rectified movie images;

displaying the resized, interleaved movie images on the display screen so that the displayed movie images appear as a three-dimensional movie image when viewed through the parallax barrier.

* * * * *